United States Patent [19]

Dam

[11] Patent Number: 5,155,472

[45] Date of Patent: * Oct. 13, 1992

[54] CONTACT TYPE LIQUID LEVEL SENSING SYSTEM

[75] Inventor: Naim Dam, Oakland Gardens, N.Y.

[73] Assignee: Introtek International, Inc., Downers Grove, Ill.

[ * ] Notice: The portion of the term of this patent subsequent to Dec. 16, 2003 has been disclaimed.

[21] Appl. No.: 885,326

[22] Filed: Jul. 14, 1986

Related U.S. Application Data

[63] Continuation of Ser. No. 518,388, Jul. 29, 1983, abandoned.

[51] Int. Cl.⁵ .............................................. G08B 21/00
[52] U.S. Cl. ...................................... 340/621; 367/93; 73/290 V
[58] Field of Search ................... 340/621, 618; 367/93; 73/290 V

[56] References Cited

U.S. PATENT DOCUMENTS

| | | | |
|---|---|---|---|
| 3,625,058 | 12/1971 | Endress et al. | 73/290 V |
| 3,748,635 | 7/1973 | Phillips et al. | 340/621 X |
| 3,863,244 | 1/1975 | Lichtblau | 340/572 |
| 4,010,458 | 3/1977 | Köpfli | 340/556 |
| 4,202,049 | 5/1980 | Wetzel | 73/290 VX |
| 4,299,114 | 11/1981 | Silvermetz et al. | 73/290 V |
| 4,482,889 | 11/1984 | Tsuda et al. | 367/93 X |
| 4,540,981 | 9/1985 | Lapetina et al. | 340/621 X |
| 4,630,245 | 12/1986 | Dam | 340/621 X |

Primary Examiner—Joseph A. Orsino
Assistant Examiner—Jeffery A. Hofsass

[57] ABSTRACT

A liquid level sensing device having a transducer in which successive bursts of pulses of ultrasonic energy are transmitted across a gap. When liquid is present in the gap the bursts of pulses are received and signal processed to indicate the presence of liquid in the gap.

18 Claims, 2 Drawing Sheets

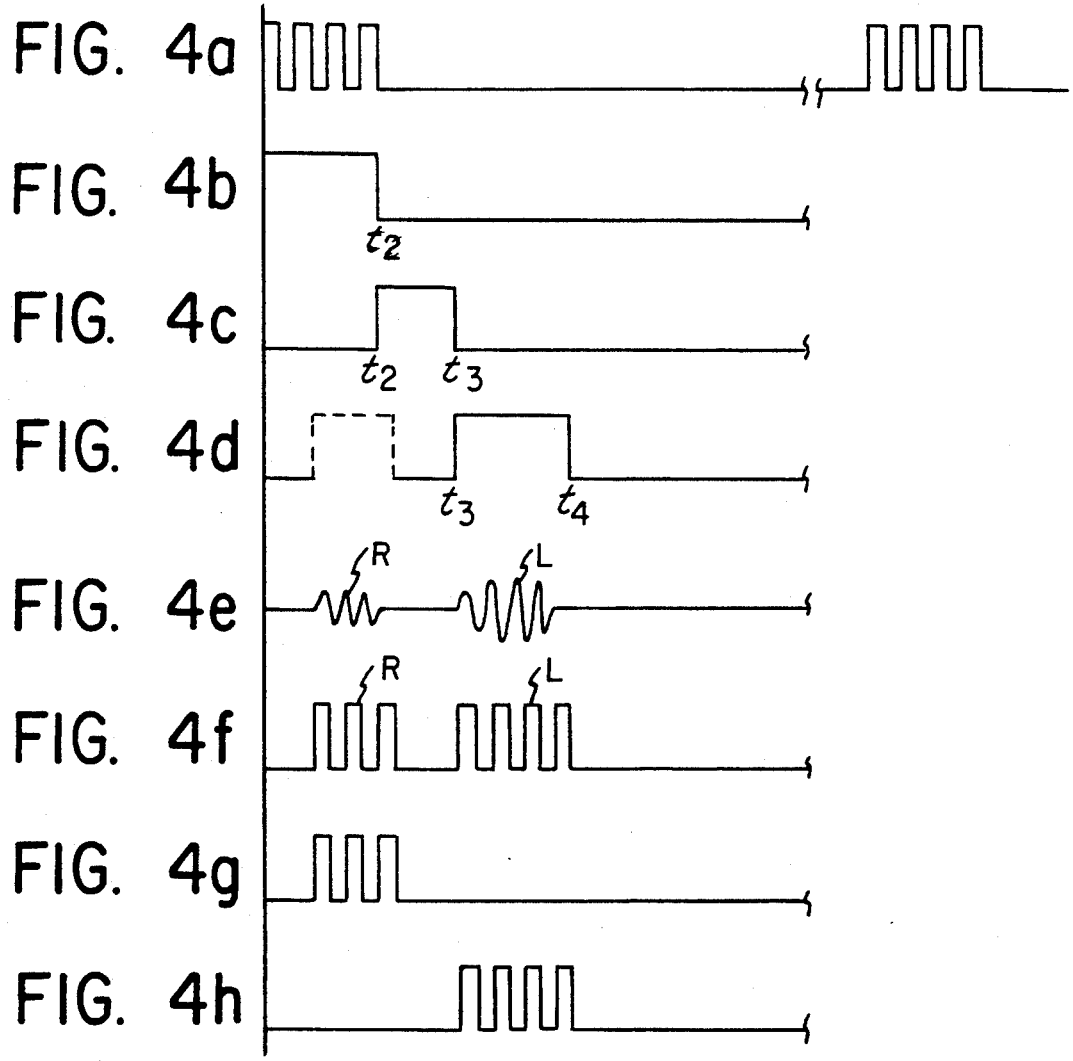
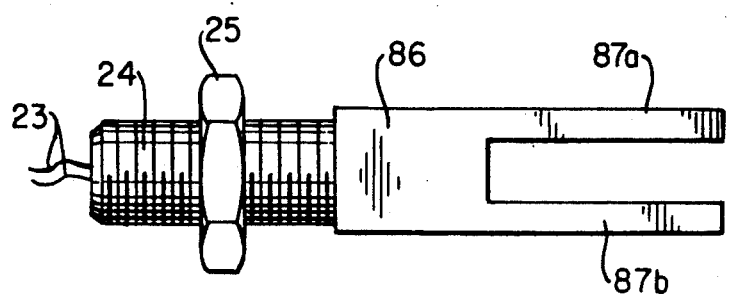
FIG. 5

CONTACT TYPE LIQUID LEVEL SENSING SYSTEM

This is a continuation of application Ser. No. 518,388, filed Jul. 29, 1983, now abandoned.

In U.S. Pat. No. 3,520,186 to Adams et al, an ultrasonic liquid level sensor is disclosed which utilizes a transducer having two tines extending from a central body with a gap between the tines. The transducer is mounted on the wall of a pipe tank or vessel so that the tines can come into contact with a liquid therein. Thus, the sensor is called a contact type. Each tine has a piezoelectric element mounted therein, one acting as a transmitter and the other as a receiver. The two piezoelectric elements are part of a closed loop oscillator circuit in which the transmitter element is operated at all times to produce ultrasonic energy in the range after being excited by electrical energy. Thus, the sensor is of the continuous wave (CW) type.

When liquid is present in the gap between the two tines, ultrasonic energy is conveyed through the liquid from the transmitter piezoelectric element to the receiver element. The latter element converts the received ultrasonic energy into electrical energy to thereby complete the closed loop and to start the circuit oscillating. If there is no liquid present in the gap, then the ultrasonic energy is attenuated in the space and the circuit will not oscillate.

By mounting the transducer in the wall of a pipe, tank or vessel at a predetermined height, the presence or absence of a liquid can be sensed at that point. Usually, when the circuit begins to oscillate, or stops oscillating, a control relay is energized and this indicates the presence of or removal of liquid from the vessel at the location of the transducer.

While the circuit of the aforesaid patent is operative, it has several disadvantages. First of all, it may be somewhat susceptible to noise and can be made to oscillate when it should not. In addition, the circuit is not always sensitive when the liquid is highly aerated or is highly, and sometimes even moderately, viscous.

The present invention is also directed to a contact type sensor. However, instead of utilizing continuous wave ultrasonic energy which is transmitted from one piezoelectric element to the other, it uses pulses or bursts of energy which are produced by a transmitter piezoelectric element of a transducer at predetermined times. These are transmitted across a gap to another part of the transducer which may not or may contain a receiver piezoelectric element. In the case where there is no receiver element, and there is liquid present in the gap, the ultrasonic energy is reflected from the second part of the transducer back to the first part in which the transmitter element now acts as a receiver element. If there is no liquid in the gap, the ultrasonic energy is attenuated and is not reflected back to the piezoelectric element. Where there is a separate receiver element in the second part of the transducer, a similar effect occurs without the reflection.

In either case, since bursts of energy at predetermined times are used, the receiver circuitry is designed to look for these bursts at predetermined times corresponding to the width of the gap between the two. Also, in accordance with the invention, the received bursts of energy are sensed in a signal processing circuit in a manner to prevent false alarms. Further, the circuit can be provided with a self test function.

It is therefore an object of the present invention to provide a contact type ultrasonic liquid level sensor using pulsed energy.

A further object is to provide a contact type ultrasonic liquid level sensor in which bursts of ultrasonic energy are received at predetermined times when the transducer is immersed in a liquid.

Another object is to provide a contact type ultrasonic transducer which has a self test function.

Other objects and advantages of the present invention will become more apparent upon reference to the following specification and annexed drawings in which:

FIG. 1 s a cross-sectional view showing the transducer mounted in the wall of a vessel;

FIG. 4 shows waveforms at various points of the circuit; and

FIG. 5 is a view of a transducer.

Figure 2:
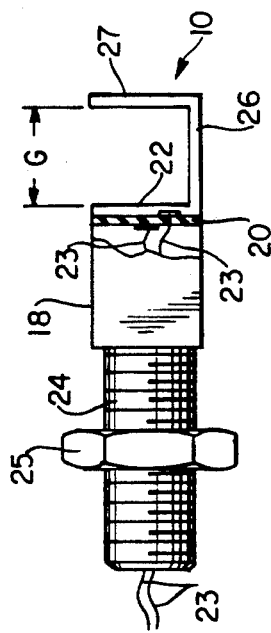
FIG. 2 is a further view of transducer.
Figure 1:
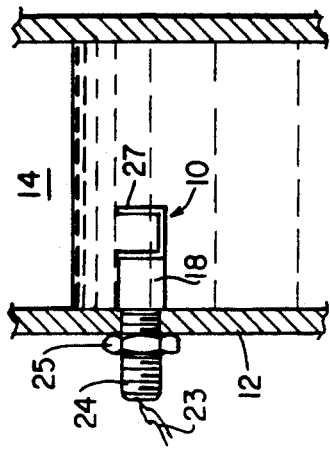

FIG. 1 shows a transducer 10 of the sensor system which is mounted in the wall 12 of a pipe, tank or vessel 14, hereafter called a vessel. As shown in FIGS. 1 and 2, the transducer 10 has a body 18 of any suitable shape, such as cylindrical, and any suitable material such as, for example, stainless steel, KYNAR, CPVC, TEFLON, etc. The body is hollowed out and a piezoelectric element 20, for example, of PZT or barium titanate, is embedded therein against a front wall 22 of the body. A pair of leads 23a, 23b are connected to electrodes on the element 20 so that an excitation voltage can be applied thereto. The element 20 vibrates in response to this voltage to produce ultrasonic (electromechanical) energy. The hollow portion of the body can thereafter be filled with an epoxy compound to seal it off.

A threaded fitting 24 is formed at the rear of the body. This can be either an integral part of the body or attached to it. A hex nut 25 is formed on the fitting so that the transducer can be tightened by a wrench when it is threaded into a corresponding fitting on the vessel wall. The wires 23a, 23b are brought out as a cable 23, preferably a coaxial cable.

A rod 26 of any suitable shape is attached to the body 18 and a circular reflection plate 27 is attached to the front of the rod. The rod defines a space, or gap G between the front wall 22 of the body in back of which the piezoelectric element is located and the reflector plate. The rod and plate can be integrally formed if the sensor is milled from a solid piece of material on the rod and/or plate attached separately by any suitable process corresponding to the type of material used, i.e., welding or brazing of metal, adhesive or epoxy if the transducer is of such materials. All of these techniques for forming the sensor are conventional.

In general, ultrasonic energy is produced by the piezoelectric element 20 when it is excited and it is radiated through the front wall 22 into the gap G to the reflector plate 27. If liquid is present in the gap G, then the ultrasonic energy reaches the plate and it is reflected back to the element 20 where it can be detected. If there is no liquid in the gap, then the energy is attenuated and it does not reach the reflector plate or returns to the element 20 at a very reduced amplitude. Thus, the presence or absence of liquid can be detected at the level of where the transducer is mounted in the vessel.

The thickness t of the plate 27 should be selected to make the plate as efficient a radiator as possible. Generally, this is accomplished by making the thickness equal to $(2n-1)\lambda/b$ 4 where:

n = an integer, and $\lambda$ = the wavelength of the ultrasonic energy.

This results in a mismatch at the reflecting surface of the plate producing a high degree of reflectivity.

If there is no liquid in the gap G, then the energy transmitted into the gap will be attenuated. However, a portion of the energy will travel through the rod 26 to the plate 27 and back through the rod 26 to the element 20. This energy arrives back at element 20 before energy would be reflected back from plate 27 when there is a liquid present in the gap. The existence of the time difference permits reliable detection and discrimination between the two signals. As described below, the energy which is transmitted through the transducer body can be used to perform a self-test function.

Figure 3:
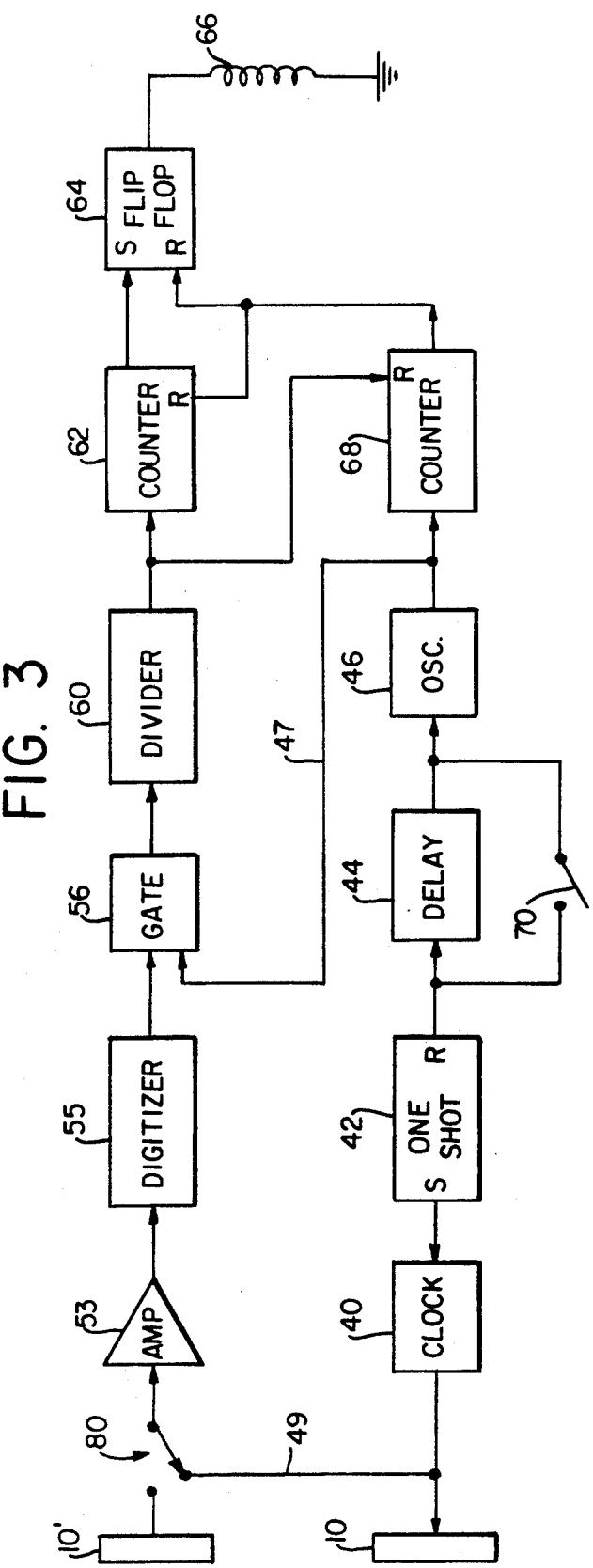
FIG. 3 is a schematic block diagram of the electronic circuit.

Referring to FIG. 3, the circuitry of the system includes a clock pulse generator 40 which produces bursts of ultrasonic energy in the form of rectangular clock pulses at a desired frequency. Typical frequencies which have been found to work successfully are in the range of from about 3 Mhz to about 5 Mhz. Other frequencies can be used depending upon the type of liquid to be sensed. While these frequencies may also be considered to be in the low radio frequency range, they are also considered to be ultrasonic in the sense that they are of higher frequency than sound waves and it is the mechanical properties of the energy which is relied upon for transmission through the liquid rather than the electromagnetic properties. The wafer 20 of piezoelectric material is cut to be resonant at or near the frequency of the pulses from the pulse generator 40.

As indicated previously, the ultrasonic energy is attenuated if there is no liquid in the gap G and if a liquid is present it is transmitted across the gap G to the reflector 27 and reflected back to the piezoelectric element 20.

The clock pulse generator 40 is gated on for a predetermined time period by a monostable, self-triggering, one-shot multivibrator circuit 42 which produces a transmit time window. The on time period for the clock pulse generator is from $t_0$ to $t_2$ as shown on line a of FIG. 4 during which the clock pulses are provided to the transducer 10 for transmission into the gap G. The clock pulses are shown on line b. It should be understood that many more pulses than those shown are produced during this period. The one-shot multivibrator 42 is set to have an off period, as shown on line a of FIG. 4 from $t_2$ back to $t_0$ of the next cycle. During the off time of the clock no clock pulses are supplied to the transducer, but, instead, the transducer is available to listen for received energy which is either reflected back from the plate 27 across the gap G when there is a liquid present or is transmitted through the rod 26 and thereafter back to the element 20. Also, during this off period, processing of the received signals is taking place.

At the end of the transmit window, when the one-shot 42 changes state, the signal from its output is applied to the input of a triggered delay multivibrator 44 to cause it to change its state. The delay multivibrator 44 produces a predetermined delay inhibit period from $t_2$ to $t_3$ (see line c of FIG. 4). A portion of the inhibit period $t_3 - t_2$ corresponds to the time when reflected signals from rod 26 will be heard. The self-test function can be performed during the inhibit period.

The output of the delay flip-flop, when it changes state, turns on a one-shot multivibrator 46 at $t_3$ to produce a receive window enable signal on line 47 from $t_3$ to $t_4$ (see line d of FIG. 4). That is, when one shot 46 is in its first state a disable (no receive) signal is produced on its output line 47 and when in a second state an enable (receive) signal is produced on line 47.

During the receive window period $t_3$ to $t_4$, any reflected signals received from the element 20 reflected across gap G are converted from acoustic energy into an analog RF signal are applied over line 49 to the input of an amplifier 53 which can be any conventional analog amplifier. Line e of FIG. 4 shows the received signal L which occurs during the receive window period $t_3$ to $t_4$ if a liquid is present. This is of greater amplitude than the signal R which is returned to the element 20 from the rod 26.

The output of the amplifier 53 is applied to a digitizer 55. This is a conventional circuit which has a threshold detector and a pulse shaping, or squaring, circuit. The threshold detector is set above the level of noise in the system so that noise will not trigger the system. The squaring circuit squares the received signal into pulses which can be processed and counted. The output of the digitizer is applied to a gate, or AND type, circuit 56 whose other input is from line 47. The gate is opened only during the receive window period $t_3$ to $t_4$.

The receive window from time $t_3$ to $t_4$ can be of any suitable selected duration. Preferably, it is made somewhat less than the transmit window time $t_0$ to $t_2$. Its time is set to correspond to the round trip time of the energy across gap G.

The circuit performs signal processing to discriminate against false alarms, i.e. providing a signal when liquid is present when it is not, or vice versa. This is done by a signal averaging technique which produces an output signal indicating the presence of a liquid only after the reflection of energy from plate 27 back across gap G to the element 20 has been confirmed for a predetermined number of times.

Assuming that there is liquid in the vessel 14 to a level which fills the gap G, the signal received by element 20 is converted to pulses, by the digitizer during the receive window time. These pulses are provided to a divider-counter 60. The divider-counter produces an output pulse for a predetermined arbitrary number of input pulses from the digitizer. The division ratio is selected as a function of the frequency of the transmitted signal and the time duration of signal averaging desired. For example, the divider-counter 60 can be structured to produce one output pulse for every four input pulses.

The output of divider-counter 60 is applied to an overflow counter 62. This counter is set to produce an output signal after receiving a predetermined number of pulses at its input from divider-counter 60. This output signal will be retained for all subsequent input signals until the counter is reset to zero. For example, the overflow count can be that which is equal to the pulses received from the divider-counter 60 after there has been a large number, say 100, of bursts of energy transmitted into gap G. Thus, it takes 100 confirmations of the liquid being present before the overflow counter 62 produces an output signal.

The output signal from overflow counter 62 is applied to the set input of a flip-flop 64. When the flip-flop is set, it produces an output signal which is used to energize some type of an indicator or a control element, such as a relay 66. If necessary, power amplifiers can be located between the flip-flop output and the relay.

When the relay is energized, it has been determined with a reasonable degree of certainty that liquid is present in the gap G. Relay 66 can be used to perform any desired control function. If only a visual indicator is needed, then the flip-flop output can drive on LED.

The relay is deenergized, if once energized and then the liquid is removed from the vessel to a point below the transducer, or is kept deenergized in the absence of a liquid in the vessel, by a control counter 68, which is also of the overflow type. Counter 68 increments its count by one each time there is a burst of transmitted energy. This is done in response to the triggering of the multivibrator 46 which sets the receive window. The control counter 68 has a reset input which is connected to the output of counter-divider 60. The output of control counter 68 is applied to the reset input of the flip-flop 64. If a return signal is being received by the element 20, indicating that there is liquid in gap G, then control counter 68 is reset each time divider-counter 60 produces an output signal and the control counter produces no output signal. Thus, the state of the flip-flop 64 is left set and the relay 66 is kept energized.

If there is no liquid, or the liquid has dropped below the transducer level, then the counter-divider 60 will not produce a reset signal for control counter 68. The count of control counter 68 will now be incremented by one each time there is a burst of energy transmitted and it will continue to increment until its overflow level is reached this time it produces an output signal which resets the flip-flop 64 and deenergizes relay 66. At the same time, its output signal is used to reset counter 62 so that it can start to increment from a zero level once the digitizer 55 produces output pulses in response to the occurrence of a liquid in gap G. The overflow count of control counter 68 can be any suitable number.

It should be noted that if the vessel was originally dry the digitizer 55 produces no output pulses, counter 62 does not overflow and the flip-flop 64 is never set. In this case, control counter 68 is not reset and is kept in the overflow state by the signal from multivibrator 46 at each transmit cycle. This keeps flip-flop 64 reset and relay 66 deenergized.

If a dry vessel is filled with liquid to the level of the transducer, then the digitizer 55 produces pulses which reset control counter 68 and keep it from incrementing. The flip-flop 64 will temporarily stay in the reset condition, but after a time the counter 62 will be overflowed so that it produces a signal to set the flip-flop 64 and thereby energize the relay.

The circuit has a self test capability which can be used to check the system. This is provided by disabling the delay multivibrator 44 as shown illustratively by bypassing it when switch 70 is closed. When this is done, the receive window is moved toward $t_0$ to occur at about the time when the reflected signal from the rod 26 is received (see lines d, f and g and h of FIG. 4). However, now the signals transmitted through the rod 26 are digitized and divided by counter divider 62 which produces output pulses to increment counter 62 and energize relay 66. This provides a self test of all of the electronic circuitry and the transducer. If the relay is not energized during the self-test, then there is a defect in either the transducer or the electronic circuitry.

Even if a liquid is present in the vessel during self-test, no reflected signals from plate 27 across gap G are processed. These signals cannot be passed from the digitizer to the signal processing circuitry since the receive window occurs earlier. If the vessel is dry, then there are no reflected signals to be processed. It should be understood that the self-test window can be adjusted by the use of another multivibrator than having 44 a different time delay.

FIG. 5 shows another type of transducer 84 which can be used with the present invention. Here, there is a central body 86 of cylindrical shape with a pair of tines 87a, 87b extending therefrom. The tines are somewhat less than half cylinders with a gap G between them. Here, there is a piezoelectric element mounted in each tine, one being designated 10 and the other 10'. The purpose of this is described below. Two two lead cables or four wires are brought out from the body, two wires for each element.

Where only one element 10 is used in one tine, the other acts as the reflector, like the plate 27 of the transducer of FIGS. 1 and 2. The circuit of FIG. 3 can be used as previously described. Self test in performed by the energy which is transmitted through the portion of the body between the two tines.

In some instances, e.g. a highly areated or highly viscous liquid, the gain of the system must be increased in order to provide accurate operation. This can be accomplished in several ways. For example, the amplitude of the clock pulses supplied to the piezo element 20 can be increased and/or the size of the element 10 increased. Sometimes, this is not feasible. Another alternative, as shown in FIG. 5, is to use a second piezoelectric element so that element 10 acts as a transmitter and element 10' as a receiver.

The circuit of FIG. 3 can be used for the two transducer arrangement by the addition of a switch 80, although the circuit can be hardwired for two transducers. Here the energy from transmitter 10 makes only a one way trip across gap G to the receiver element 10' and the receiver piezoelectric element 10' directly feeds the analog amplifier 53. In this case, the delay period $t_2-t_3$ can be made shorter since only one way travel of the energy across gap G is needed. The other time period can be adjusted as needed. In all other respects the system operates the same as previously described. The gain of the system is increased since the signal has to travel only one way through the liquid, there is no loss due to the reflection and there is no attenuation on the return trip.

The transducer of FIGS. 1 and 2 also can be used with a two piezoelectric element configuration. In this case, the second element 10' is mounted within the plate 27 but the plate no longer serves as a reflector. The wires for the element 10' are passes through rod 26.

What is claimed is:

1. A contacting type liquid level sensing system comprising:
    transducer means to come into contact with the liquid,
    said transducer means having a first portion, a piezoelectric element mounted within said first portion, and a second portion spaced from said first portion and defining a gap between said first and second portions,
    means for transmitting successive bursts each having a number of pulses, of electrical energy to said piezoelectric element to cause it to vibrate to produce corresponding bursts of pulse of sonic energy which are transmitted across the gap to said transducer means in the presence of a liquid, said transmitted sonic energy being attenuated in the absence of a liquid, means for receiving the successive bursts of pulses of sonic energy incident upon said second portion for converting the individual pulses of said received bursts of pulses of sonic energy into first electrical signals, and processing circuit means including pulse counter means coupled to said receiving means and responsive to the presence of a predetermined number of said first signals converted from a predetermined number of said successive bursts of pulses for indicating the presence of liquid in said gap and to the absence of said predetermined number of first pulses for indicating the absence of said liquid.

2. A contacting type liquid level sensing system as in claim 1 wherein said processing circuit means utilizes said first electrical signals starting at a predetermined time after each burst of sonic energy is first transmitted by the piezoelectric element of said first portion.

3. A contacting type liquid level sensing system as in claim 1 wherein said means for transmitting the sonic energy and for receiving the sonic energy comprise said piezoelectric element of said first portion, said energy being reflected from said second portion back to said piezoelectric element of said first portion.

4. A contacting type liquid level sensing system as in claim 2 wherein said means for transmitting the sonic energy and for receiving the sonic energy comprise said piezoelectric element of said first portion, said energy being reflected from said second portion back to said piezoelectric element of said first portion.

5. A contacting type liquid level sensing system as in claim 1 wherein said means for receiving the sonic energy comprise a separate piezoelectric element at the second portion of said transducer means.

6. A contacting type liquid level sensing system as in claim 2 wherein said means for receiving the sonic energy comprise a separate piezoelectric element at the second portion of said transducer means.

7. A contacting type liquid level sensing system as in claim 2 wherein said circuit means further comprises means for producing second signals in response to said first electrical signals after each said predetermined time occurring after a said burst of electrical energy, and said pulse counter means being responsive to a predetermined number of said second signals to produce an output control signal indicative of the presence of a liquid in the gap.

8. A contacting type liquid level sensing system as in claim 7 wherein said means for producing said output control signal further comprises first counter means which is incremented in response to said second signals.

9. A contacting type liquid level sensing system as in claim 7 further comprising means responsive to the absence of said first electrical signals after said predetermined time to produce a third signal which is indicative of the absence of liquid in the gap.

10. A contacting type liquid level sensing system as in claim 2 further comprising means responsive to the absence of said first electrical signals after said predetermined time to produce a third signal which is indicative of the absence of liquid in the gap and means for applying said third signal to said counter means to reset it.

11. A contacting type liquid level sensing system as in claim 9 wherein said means responsive to the absence of said first electrical signals comprises second counter means, means coupled to said second counter means to increment its count in response to successive bursts of transmitted energy, said second counter means producing said third signal in response to being incremented to a predetermined count of said successive bursts.

12. A contacting type liquid level sensing system as in claim 10 wherein said means responsive to the absence of said first electrical signals comprises second counter means, means coupled to said second counter means to increment its count in response to successive bursts of transmitted energy, said second counter means producing said third signal in response to being incremented to a predetermined count of said successive bursts.

13. A contacting type liquid level sensing system as in claim 9 further comprising means responsive to one of said output control signal and to said third signal to produce an indication of the presence or absence of liquid in said gap.

14. A contacting type liquid level sensing system as in claim 11 further comprising means responsive to one of said output control signal and to said third signal to produce an indication of the presence or absence of liquid in said gap.

15. A contacting type liquid level sensing system as in claim 1 further comprising means for receiving energy transmitted through the body of said transducer means at a predetermined time before the burst of energy would be received if transmitted across the gap when liquid is in the gap and received.

16. A contacting type liquid level sensing system as in claim 15 wherein said processing circuit means produces an output signal after receiving energy transmitted through the body of said transducer means only after transmission of a predetermined number of bursts of sonic energy.

17. A contacting type liquid level sensing system as in claim 1 wherein said first portion of said transducer means comprises a body, a rod extending from said body, and said second portion connected to said rod.

18. A contacting type liquid level sensing system as in claim 1 wherein said transducer means comprises a central body and a pair of spaced tines extending from said central body comprising said first and second portions.

* * * * *